Nov. 25, 1941.    H. W. CARNES    2,263,611

PRESSURE REGULATOR

Filed May 10, 1939

INVENTOR
HERMAN W. CARNES
BY
*Greenewald*
ATTORNEY

Patented Nov. 25, 1941

2,263,611

UNITED STATES PATENT OFFICE 2,263,611

PRESSURE REGULATOR

Herman W. Carnes, Indianapolis, Ind., assignor to Oxweld Acetylene Company, a corporation of West Virginia Application May 10, 1939, Serial No. 272,765

11 Claims. (Cl. 50—26)

This invention relates to pressure-regulating and reducing valves, and more particularly to a gas-pressure regulator for reducing and regulating the pressure of gas supplied from cylinders of compressed gas, such as acetylene cylinders, to consuming apparatus, such as gas burners, blow-pipes, and the like.

The invention has for its principal object to provide an improved pressure regulator which shall efficiently maintain a desired relatively constant delivery pressure, which shall be simple and economical to manufacture, which may be rapidly assembled, and which will maintain a fixed pressure adjustment for a relatively long period. It is also an object to provide a regulator that is readily adjustable to maintain constant a relatively wide range of different delivery pressures. It is a particular object to provide a regulator having a valve mechanism that is easily removable as a unit without dismantling other portions of the regulator, and which unit may be replaced by the user so that it is unnecessary to return the regulator to the factory for repairs.

The above and other objects and novel features of this invention will become apparent from the following description and the accompanying drawing in which.

Figure 1:
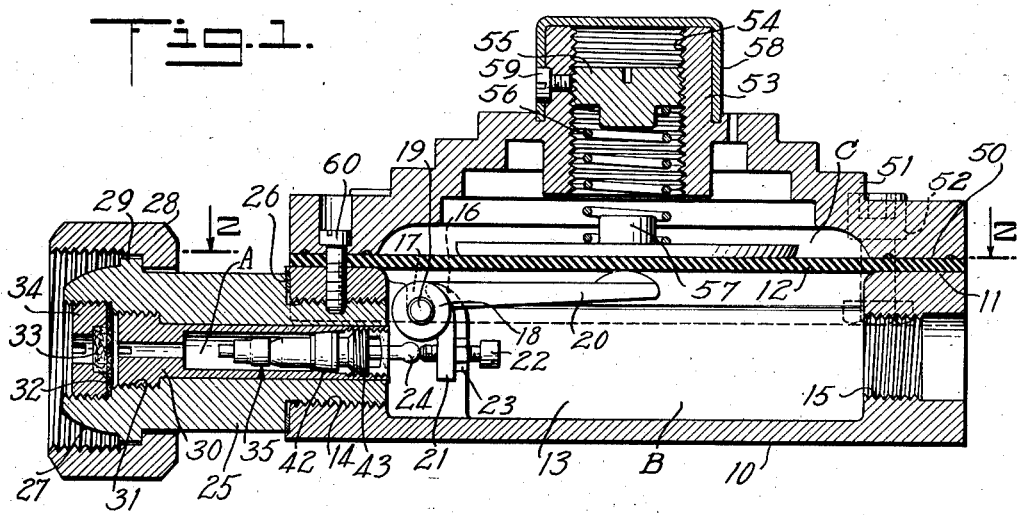
Fig. 1 is a central longitudinal sectional view of a regulator constructed in accordance with the present invention.
Figure 2:
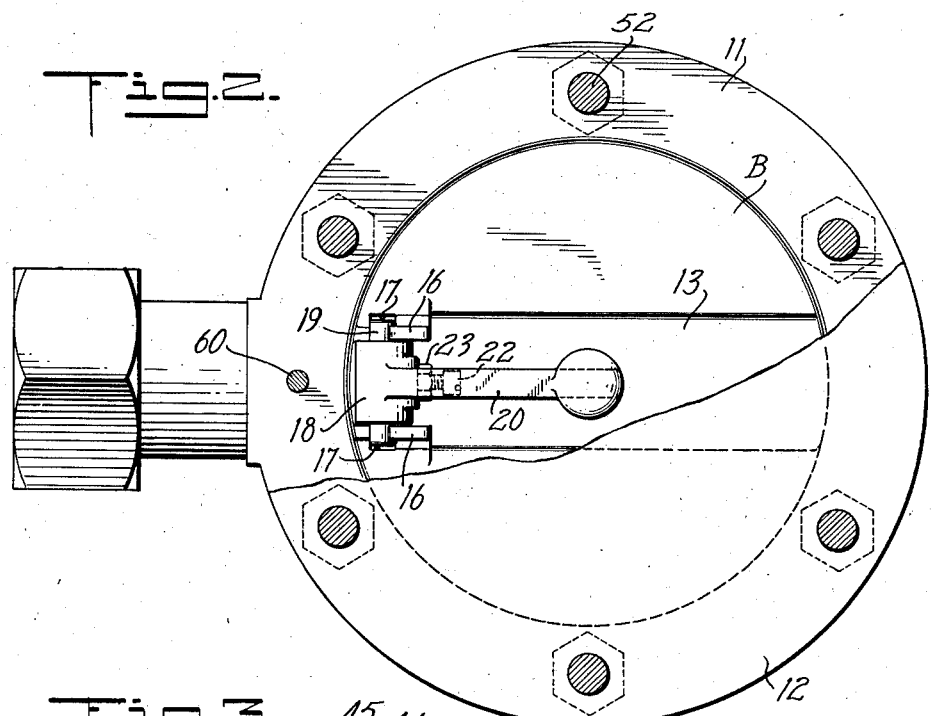
Fig. 2 is a plan view of the regulator shown in Fig. 1, with the diaphragm housing removed and part of the diaphragm cut away to show the lever.

The regulator, in general, employs the customary pressure-responsive means in the form of a flexible diaphragm clamped between two casing sections providing a diaphragm or spring chamber and a delivery-pressure or outlet chamber. An adjustable spring acts against the upper side of the diaphragm which is raised upward against the spring by the pressure of gas in the outlet chamber. A lever is pivotally secured in the outlet chamber for transmitting movements of the diaphragm to a valve that controls the flow of gas from an inlet passage into the outlet chamber, the arrangement being such that a slight fall of outlet pressure causes the diaphragm to move the valve by means of the lever so that the valve port is opened wider allowing more gas to flow from the inlet passage into the outlet chamber to maintain the desired delivery pressure.

Referring now to the drawing, an inlet chamber within the inlet passage is shown at A, the outlet chamber at B, and the diaphragm or spring chamber at C. The outlet chamber B comprises a lower casing section 10 having an opening bounded by an annular rim 11, the opening being sealed by the diaphragm 12 having its marginal portion secured against the rim 11. The bottom of the casing section 10 has a trough-like depression 13 which extends diametrically from one side to the other side of the rim 11. A threaded inlet opening 14 and a threaded outlet opening 15 are provided in the respective end walls of the trough 13, the threaded outlet opening 15 being arranged to receive a threaded nipple or valve controlled connection to which a flexible conduit may be secured for conducting gas to the consuming apparatus. Such connection and conduit are not shown in the interest of clearness of the drawing.

Adjacent the inlet opening 14, the side walls of the trough 13 have a pair of directly opposite lugs 16 formed integrally thereon. The lugs 16 are provided with slot-like recesses 17 therein which are open at the top. A pivot for a bell-crank valve lever 18 is provided by securing the ends of a transverse shaft 19 in the recesses 17, the ends of the shaft 19 being held in position by bending an upwardly projecting tip of one side of each recess 17 inwardly above the shaft. The hub of lever 18 is journaled on the shaft 19 between the lugs 16. The lever 18 has a long arm 20 that extends substantially horizontally and longitudinally of the trough 13 to the center of the diaphragm where it normally contacts with the under surface of the diaphragm 12. The short arm 21 of the lever 18 extends substantially vertically downward in the trough 13 and is provided with a normally horizontal adjusting screw 22 having a lock nut 23. The end of the adjusting screw 22 contacts with the end of a valve stem 24 that extends into the trough 13. Secured in the inlet opening 14 is a nipple 25 which engages with the threads of the opening 14 and forms a gas-tight seal with the end of the casing section 10 by means of a gasket 26. The nipple 25 has an end 27 shaped to form a seal with the outlet of a compressed gas cylinder and, for such purpose, is also provided with a coupling nut 28 acting against a shoulder 29 on the nipple for drawing the end 27 to a gas-tight seat with the gas-supplying device.

The nipple 25 is axially bored to form the inlet passage and to receive a sleeve 30 which has an externally threaded enlarged head portion 31 for threadedly engaging with a portion of the bore of the nipple near the inlet or fluid-receiving end thereof. The sleeve 30 extends inwardly from the head portion 31 to a point at the inlet end of the trough 13. The inlet or outside end of the nipple 25 is also provided with a dust filter comprising a screen 32 and a felt disc 33 which are secured in place by an externally threaded ring 34, the threads of which mesh with corresponding threads in an enlarged end portion of the bore of the nipple 25. The sleeve 30 is axially bored to form the inlet chamber A and to receive a unitarily removable and replaceable valve mechanism 35.

Figure 3:
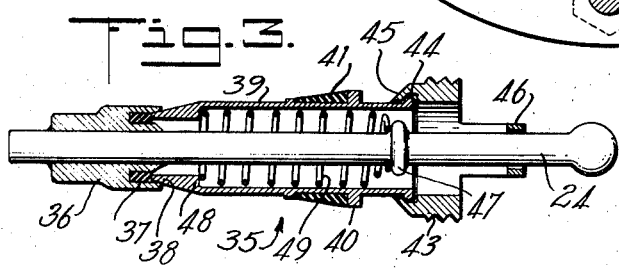
Fig. 3 is a longitudinal sectional view on an enlarged scale of the replaceable valve unit employed in the regulator.

The valve mechanism unit is shown in greater detail in Fig. 3 and comprises a valve element or seat 36 which is secured to the valve stem 24 near its left-hand end. The valve element 36 has an annular channel in the right-hand face thereof, which channel is preferably filled with a valve-seat material 37 such as a specially prepared rubber composition, to make a gas-tight seat against a valve nozzle 38 which is formed at the inlet end of a tubular valve casing 39. The casing 39, at a point spaced from the right-hand end thereof, is provided with an annular shoulder 40 to the left of which is secured a conical annular gasket 41 for making a gas-tight seal against a correspondingly conical seat 42 in the bore of the sleeve 30. The gasket 41 is held tightly against seat 42 by an externally threaded annular nut 43 which engages with threads at the outlet end of the bore of sleeve 30. The nut 43 is swiveled at the end of the casing 39 by providing an outwardly-extending rim 44 at the end of the casing which engages with a channel in the nut 43, the nut 43 also having a skirt portion 45 that is spun inwardly so that the nut 43 cannot become separated from the casing 39. The nut 43 is also provided with means for guiding the valve stem 24, said means consisting of a transverse portion 46 that is bored to loosely receive the stem 24. Means are also provided for normally holding the valve seat 36 against the valve nozzle 38, said means comprising a collar or shoulder 47 on the stem 24 at a point adjacent the outlet end of the casing 39, an internal shoulder 48 in the bore of the casing 39 near the nozzle 38, and a spring 49 having ends engaging and compressed between the shoulders 47 and 48.

It will be seen that the valve mechanism 35 is a self-contained replaceable unit which can be quickly replaced by removing the ring 34 and filter members 33 and 32, unscrewing the sleeve 30, and then unscrewing the nut 43 from the end of the sleeve. Although it is preferable to employ the sleeve 30, obviously it is possible to omit the sleeve 30 and secure the replaceable valve mechanism directly in the bore of the nipple 25. To renew the valve mechanism in such a case, it would be necessary to unscrew the nipple 25 from the casing section 10.

The diaphragm 12 is secured in a gas-tight manner against the rim 11 by the rim portion 50 of a diaphragm chamber-casing section 51, the rims being secured together by any suitable means, such as bolts 52. The head and nut portions of the bolts 52 are preferably countersunk into the rim portions 11 and 50 to improve the appearance. The casing section 51 is provided with a central boss 53 having a threaded vertical bore 54 in which is secured an externally threaded spring-adjusting plug 55. A pressure-regulating spring 56 is disposed between the plug 55 and a diaphragm plate 57 that rests in contact with the top of the diaphragm. The upper end of the bore 54 is preferably sealed by a cap 58 and a lock screw 59 is provided in the wall of the bore 54 to secure the cap 58 in place. To lock the nipple 25 against turning with respect to the casing section 10, a set screw 60 passes through the rims 50 and 11 into a depression in the nipple 25. The casing sections 10 and 51 are preferably formed by die casting, but the inlet nipple 25 is preferably machined from bar stock. The lever 18 may also be a die casting.

In assembling the regulator, the lever 18 with the shaft 19 is dropped into place and the upstanding tips of the lugs 16 are bent inward against the ends of the shaft 19. The nipple 25 is assembled to the casing section 10, the unitary valve mechanism is assembled in the sleeve 30, and the sleeve 30 is assembled into the bore of the nipple 25. The filter and ring 34 are put in place. Next, the diaphragm 12 with the plate 57 and spring 56 thereon is laid on the rim 11, the casing section 51 bolted down against the diaphragm 12, and the plug 55 inserted. The screw 60 is threaded through casing sections 51 and 11 and into the depression in the nipple 25.

The regulator is put on a test apparatus and the plug 55 adjusted until the proper delivery pressure is registered. The cap 58 may then be put on and locked with the screw 59.

By suitable adjustment of the plug 55 or by changing the strength of the spring 56, or both, the regulator can be set for a relatively very wide range of delivery pressures from two ounces per square inch gauge to at least fifteen pounds per square inch gauge. Such pressure setting will ordinarily be maintained for a long period of use. However, if the valve should become leaky through some unforeseen cause, the valve unit can be quickly replaced by the user by merely removing the ring 34, filter members 33 and 32, and sleeve 30. In the regulator shown and described, the valve element 36 seats against the valve nozzle 38 in the direction of normal fluid flow from the inlet chamber A to the outlet chamber B. The force of the inlet pressure in chamber A will thus assist in holding the valve element 36 closed. Such an arrangement also provides for the transmission of the force of the downward movement of the diaphragm 12 to the lever arm 20 and from the lever arm 21 to the valve stem 24 solely by compressive contact.

Although the particular regulator here shown for the purpose of illustrating the principles of the invention is described in detail, it is to be understood that various changes may be made in the construction without departing from the principles of the invention.

I claim:

1. A fluid pressure regulator comprising, in combination, a casing including two chambered sections; a pressure-responsive diaphragm having its margin secured between said sections and having the portion thereof within said margin separating the chambers of said sections; one casing section comprising a relatively deep trough-like portion extending centrally across the bottom thereof, said trough-like portion having an inlet opening at one end and an outlet opening at the other end and also having recessed lugs integral with the side walls thereof adjacent said inlet opening; a bored nipple having one end secured in said inlet opening; a bored sleeve secured within the bore of said nipple and removable from the outside end thereof; a valve unit within said sleeve for controlling the admission of fluid to said trough-like portion, said valve unit including a normally-closed valve port and a valve stem projecting into said trough-like portion; and a lever pivoted in the recesses of said lugs and having one arm projecting into said trough-like portion and adapted to engage said stem, said lever having another arm projecting outside said trough-like portion and adapted to engage said diaphragm.

2. Apparatus as claimed in claim 1, in which said valve unit includes a valve element which is adapted to close said valve port when moved in the direction of fluid flow through the regulator; said valve unit being secured within said bored sleeve so that it is unitarily removable therewith from the end of said nipple opposite that which is secured in said inlet opening.

3. A fluid pressure regulator comprising, in combination, a casing including two chambered sections; a pressure-responsive diaphragm having its margin secured between said sections and having the portion thereof within said margin separating the chambers of said sections; one casing section comprising a relatively deep trough-like portion extending centrally across the bottom thereof, said trough-like portion having an inlet opening at one end and an outlet opening at the other end and also having recessed lugs integral with the side walls thereof; a bored nipple secured in said inlet opening; a bored sleeve secured in the bore of said nipple and removable from the outside end of said nipple; a replaceable valve unit removably secured in the bore of said sleeve, said valve unit comprising a movable valve element, an annular valve nozzle, a valve stem secured to said valve element, and a guide for said valve stem, said valve stem extending into said trough-like portion; a lever pivoted for movement in said trough-like portion and having an arm engaging said stem for controlling said valve element and a second arm operably connected with said diaphragm; and a pivot for said lever extending across said trough-like portion and secured in said recessed lugs.

4. A fluid pressure regulator as claimed in claim 3 in which said valve unit is secured in the bore of said sleeve in such a manner that, when said sleeve is removed from said nipple, said valve unit may be readily removed from and replaced within the bore of said sleeve.

5. A fluid pressure regulator comprising, in combination, a casing including two chambered sections; a pressure-responsive diaphragm having its margin secured between said sections, the portion thereof within said margin separating the chambers of said sections; one casing section comprising an outlet chamber having an inlet opening and an outlet opening in the walls thereof; a bored nipple secured in said inlet opening; a bored sleeve secured in the bore of said nipple and removable from the outside end of said nipple; a replaceable valve unit removably secured in the bore of said sleeve, said valve unit comprising a movable valve element, an annular valve nozzle, a valve stem secured to said valve element and a guide for said valve stem, said valve stem extending into said outlet chamber; and a lever pivotally mounted in said outlet chamber and having an arm engaging said valve stem for controlling said valve element and a second arm operably connected with said diaphragm.

6. In a pressure regulator, the combination with an outlet chamber, adjustable fluid-pressure responsive means responsive to pressure in said outlet chamber, and an inlet passage communicating with said chamber, said inlet passage having a fluid-receiving end which is adapted to be connected directly with the source of fluid supply; of a valve unit within said inlet passage for controlling the flow of fluid from said inlet passage into said outlet chamber; means for transmitting movements of said pressure-responsive means to said valve unit; and means constructed and arranged so that said valve unit is readily and unitarily removable and replaceable through the fluid-receiving end of said inlet passage; said valve unit comprising a tubular casing having an external annular portion adapted to be secured in said inlet passage in a fluid-tight manner and having an annular valve nozzle at one end thereof, a valve element normally closing said valve nozzle, a valve stem secured to said valve element and passing axially through said casing and having an end portion adapted to engage said movement transmitting means, resilient means acting between said casing and said valve stem for holding said valve element normally against said valve nozzle, and means adjacent the end of said casing which is opposite said valve nozzle for axially guiding said valve stem.

7. In a pressure regulator, the combination with an outlet chamber, adjustable fluid-pressure responsive means responsive to pressure in said outlet chamber, and an inlet passage having a fluid-receiving end which is adapted to be connected directly with the source of fluid supply; of a valve unit substantially entirely within said inlet passage for controlling the flow of fluid from said inlet passage into said outlet chamber, said valve unit including a valve casing having an annular valve nozzle at one end, a valve seat cooperating therewith to close said nozzle when said seat is moved in the direction of fluid flow through the regulator, a valve stem secured to said valve seat and passing through said valve casing, and resilient means disposed between a shoulder on the inside of said valve casing and a shoulder on said valve stem, and acting to urge said valve seat toward said nozzle; means for securing said valve unit within said inlet passage, with said valve stem projecting into said outlet chamber, said securing means being so constructed that said valve unit is readily and unitarily removable through the fluid-receiving end of said inlet passage; and a bell-crank lever pivoted in recesses formed integrally in the walls of said outlet chamber and having one arm operable by said pressure-responsive means and the other arm engageable with said valve stem for moving said valve seat away from said nozzle when the pressure in said outlet chamber falls below a predetermined value.

8. In a fluid-pressure regulator, the combination with an outlet chamber, adjustable fluid pressure-responsive means responsive to pressure variations in said outlet chamber, and an inlet chamber; of a valve unit within said inlet chamber for controlling the flow of fluid into said outlet chamber and having a valve stem extending into one end of said outlet chamber; a bell-crank lever having an arm operable by said pressure-responsive means, a second arm engageable with said valve stem for operating the valve, and a fulcrum bearing; a transverse shaft on which said bearing is journalled and having ends projecting on either side of said bearing; lugs projecting from and formed integrally on opposite walls of said outlet chamber and adjacent the end thereof into which said valve stem extends, said lugs having slot-like recesses formed therein for receiving the projecting ends of said shaft, a portion of the lugs being adapted to be bent inwardly against the shaft ends for securing said shaft tightly in said recesses.

9. In a fluid pressure regulator, the combination with an outlet chamber and an adjustable presure-responsive means responsive to pressure variations in said outlet chamber; a removable nipple axially bored to provide an inlet passage, which at one end is adapted to communicate with said outlet chamber, and which at the other end is adapted to connect with the source of fluid; a unitary valve mechanism within the bore of said nipple for controlling the flow of said fluid from said inlet passage into said outlet chamber, said mechanism comprising a valve casing having a valve nozzle at one end, a valve element cooperating therewith to close said nozzle when moved in the direction of said fluid flow, a valve stem secured to said valve element and passing through said casing, and resilient means acting to seat said valve element on said nozzle; and a bell-crank lever pivoted in said outlet chamber and having one arm operable by said pressure-responsive means and another arm engageable with said valve stem for unseating said valve element when the pressure within said outlet chamber falls below a predetermined value.

10. A fluid pressure regulator as claimed in claim 9 in which said nipple and said unitary valve mechanism are constructed and arranged in such a manner that said valve mechanism may be removed from and replaced within the bore of said nipple through the end thereof which connects with the source of fluid.

11. A fluid pressure regulator as claimed in claim 9 in which said valve mechanism, as a unit, may be removed from and replaced within the bore of said nipple through the end thereof which connects with the source of fluid, without disturbing said nipple, and without disturbing the adjustment of said pressure responsive means.

HERMAN W. CARNES.